May 12, 1959 C. W. WHEATLEY 2,886,062
CHECK VALVES
Filed Feb. 16, 1955

INVENTOR.
C. W. Wheatley
BY
ATTORNEY

United States Patent Office 2,886,062
Patented May 12, 1959

2,886,062

CHECK VALVES

Charles W. Wheatley, Tulsa, Okla.

Application February 16, 1955, Serial No. 488,605

1 Claim. (Cl. 137—527.8)

This invention relates to improvements in valves and more particularly, but not by way of limitation, to an improvement in self-sealing check valves.

The present day check valve is usually provided with a substantially cylindrical body having pipe connecting flanges on either end thereof to receive a fluid flow line, or the like. An internal circumferential flange is provided adjacent the inlet of the valve body and is adapted to seal a clapper member which is normally pivoted about a point above the flange. The clapper member must be of a larger diameter than the inlet of the valve in order to afford an adequate sealing against the flange when the direction of flow in the flow line is reversed. It will be apparent that the central portion of the valve body housing the clapper must, therefore, be increased in diameter to permit the proper functioning of the clapper during the operation of the valve. The increased size and the material necessary for construction of the seating flange add greatly to the weight of the valve.

The present invention contemplates a check valve having an internal diameter of substantially the same size as the flow line with which it is to be utilized. The clapper member is adapted to rotate about a centrally disposed hinge and is provided with a sealing member around its circumference. The operation of this self-sealing valve permits the valve body to be substantially reduced in size and weight which is an obvious advantage in facilitating the ease of installation and handling of the valve, as well as a savings in the overall cost thereof. It has been found, as a practical example, that the weight of a presently available twelve inch check valve is approximately 1,775 pounds as compared to a weight of approximately 275 pounds for a comparable novel check valve as disclosed in the present invention.

It is, therefore, an important object of this invention to provide a check valve of substantially less weight in order to facilitate the handling and installation thereof.

It is another object of this invention to provide a self-sealing check valve which lends itself to ease and efficiency of operation.

It is still another object of this invention to provide a self-sealing check valve which is simple and economical in construction.

Other objects and advantages of the invention will be evident from the following detailed description, read in conjunction with the accompanying drawings, which illustrate my invention.

Figure 1:
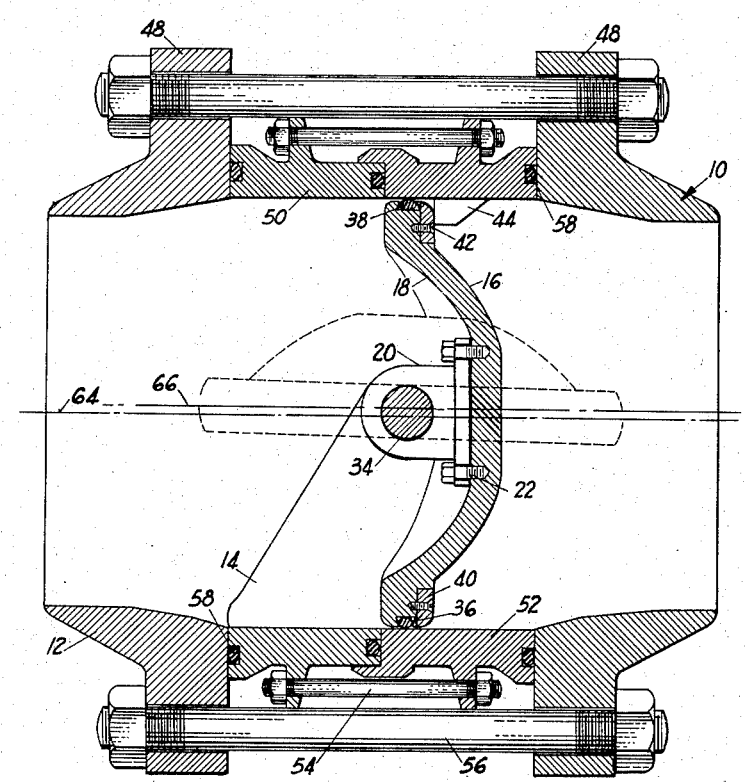
Figure 1 is a longitudinal sectional view of a check valve embodying the invention with certain portions in dotted lines for purposes of better illustration.

Referring to the drawings in detail, reference character 10 refers in general to a check valve of substantially cylindrical configuration comprising a sectional body or housing 12. A spider member 14 is disposed in the lower portion of the housing to support a circular clapper 16 in a manner as will hereinafter be set forth. The clapper 16 is provided with a cup shaped recess 18 for receiving an outwardly extending boss 20 which is secured to the clapper 16 by any suitable means, such as bolts 22. The boss 20 comprises a pair of spaced outwardly extending bearing flanges 24 and 26 provided with aligned apertures 28 and 30, respectively. The spider 14 is provided at its upper end with a tubular member 32. The tubular member 32 is of a size to correspond to the space between the bearing flanges 24 and 26, and when disposed therebetween permits the insertion of a bearing shaft 34 through the tubular member 32 and the apertures 28 and 30. The shaft may be secured to the member 32 in any suitable manner (not shown) such as set screws, cotter pins, or the like, thereby permitting the flanges 24 and 26 to freely pivot about the shaft. In this manner a hinge is formed about which the clapper 16 may rotate to an open and closed position as will be hereinafter set forth.

A recess or cut away portion 36 is provided around the periphery of the clapper 16 for receiving an O-ring 38, or the like. A retaining ring 40 may be secured to the clapper 16 adjacent the groove 36 in any well known manner, such as screws 42, to maintain the O-ring 38 within the groove. A plurality of stops 44 are disposed within the upper portion of the housing 12 and behind the clapper 16 to preclude the rotation thereof beyond the closed sealing position as shown in full lines in Fig. 1. A plurality of similar stops 46 (shown in full lines in Fig. 2) are disposed within the lower portion of the housing 12 and in front of the clapper 16 to assist in retaining the clapper in a fully closed position as will hereinafter be set forth.

The sectional housing 12 may comprise a pair of oppositely disposed flanged members of substantially the same internal diameter as a flow line (not shown) and adapted to couple therewith in any well known manner (not shown). A ring member 50 having the spider 14 secured thereto and a similar ring member 52 providing a seat for the clapper 16 bearing thereagainst are interposed between the flange members 48 and may be of a slightly larger diameter. The ring members 50 and 52 are secured together in any conventional manner, such as bolts 54, and the flange members 48 are secured together in any similar manner, such as bolts 56. The joints between the several sections are sealed in any conventional manner, such as O-rings 58. It will be apparent that the sectional arrangement of the body 12 permits easy accessibility to the interior of the valve for any necessary cleaning or repairing or the like.

Figure 2:
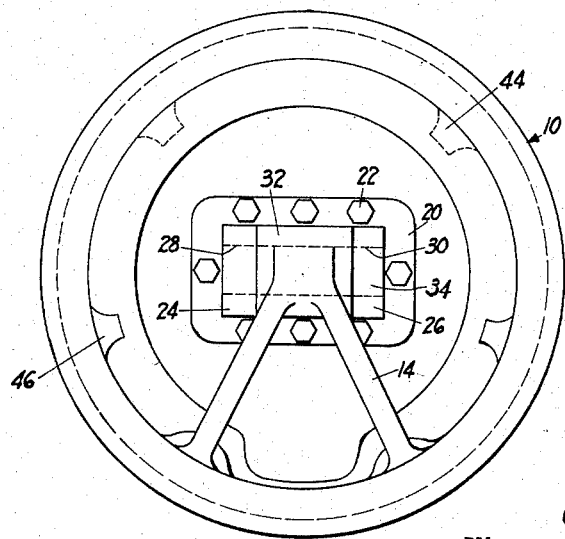
Figure 2 is an end elevational view of a check valve embodying the invention.

It will be noted in Fig. 1 that the longitudinal center line 64 of the housing 12 and the clapper 16 is slightly lower than the center line 66 of the bearing shaft 34, thus causing the clapper to be offset and off-balance toward a closed position due to the excess weight of the clapper 16 below the axis of rotation. A counter-weight (not shown) may be secured to the lower portion of the clapper 16 if desired to exaggerate this off-balance action.

Operation

The check valve 10 may be installed in a flow line (not shown) in the usual manner. For purposes of illustration, it will be assumed that the direction of flow through the valve is from left to right (Fig. 1). The fluid pressure acting upon the cup shaped recess 18 will cause the clapper 16 to rotate about the shaft 34 to a substantially horizontal position as shown in dotted lines. The stops 44 and 46 prevent the clapper from turning in a clockwise direction so that it will open in a counter-clockwise direction as shown. As long as the fluid flows through the line and valve with sufficient pressure, the clapper 16 will remain in an open position and the fluid will flow uninterrupted therethrough. If the pressure is lessened, however, and particularly if the direction of flow is changed, the preponderance of weight on the lower portion of the clapper 16 will urge the clapper to a vertical or closed position as shown in full lines in Fig. 1. The O-ring 38 around the periphery of the clapper 16 will seat against the ring member 52, thus forming a seal to preclude the flow of fluid through the valve. It will be apparent that the reversed fluid pressure in such an instance will assist the off-balance weight action of the clapper to maintain the valve in a closed position.

From the foregoing, it will be apparent that the present invention provides a novel check valve of substantially less weight than present day valves which greatly facilitates the handling thereof. The off-balance action of the rotatable clapper constantly urging the clapper to a closed position insures a positive closing action in the event there is a pressure drop in the line or a reversal in the direction of flow through the valve.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In combination with a flow line, a check valve comprising a sectional housing having a substantially smooth continuous cylindrical inner periphery, a spider member secured to the inner periphery of the housing and extending inwardly therein, an apertured boss provided on the inner end of the spider member, a cup shaped clapper valve disposed within the housing, a pair of spaced apertured flange members secured to the concave portion of the clapper valve, a pin member extending through the flange members and the boss member for pivotally securing the clapper valve within the housing, the axis of said pin member disposed parallel to and slightly above the diametrical center of the clapper valve to provide an off-balance pivotal action of the clapper valve whereby a preponderance of weight is provided in the lower portion thereof to constantly urge the clapper toward a closed position, a circumferential groove provided around the outer periphery of the clapper valve, a sealing ring disposed within the groove, an annular ring member secured to the clapper valve adjacent the sealing ring for retaining the ring in the groove, a plurality of inwardly projecting spaced stop members provided on the inner periphery of the housing for limiting the pivotal action of the clapper valve in one direction to provide a positive closing of the valve clapper thereagainst, said sealing member having direct engagement against the smooth continuous inner periphery of the housing in a closed position of the clapper for positively precluding the passage of fluid through the flow line in a closed position of the valve.

References Cited in the file of this patent

UNITED STATES PATENTS

| | | |
|---|---|---|
| 1,744,798 | Price | Jan. 28, 1930 |
| 2,586,927 | Fantz | Feb. 26, 1952 |
| 2,588,775 | Smolensky | Mar. 11, 1952 |
| 2,669,419 | Young | Feb. 16, 1954 |
| 2,781,054 | Neumann | Feb. 12, 1957 |

FOREIGN PATENTS

| | | |
|---|---|---|
| 245,650 | Great Britain | of 1926 |
| 499,093 | Germany | June 6, 1930 |
| 441,970 | Italy | of 1948 |